United States Patent [19]
Woo

[11] Patent Number: 5,881,961
[45] Date of Patent: Mar. 16, 1999

[54] REEL DRIVING DEVICE CAPABLE OF ELIMINATING FRICTION BETWEEN A PRESSING PLATE AND A ROTATING DRIVING GEAR

[75] Inventor: Jee-Sung Woo, Seoul, Rep. of Korea

[73] Assignee: Daewoo Electronics Co., Ltd., Rep. of Korea

[21] Appl. No.: 979,662

[22] Filed: Nov. 26, 1997

[30] Foreign Application Priority Data

Nov. 30, 1996 [KR] Rep. of Korea ................. 96-60751

[51] Int. Cl.[6] .................................................. G11B 15/32
[52] U.S. Cl. ..................... 242/356; 242/356.3; 242/356.5
[58] Field of Search ................................. 242/356, 356.3, 242/356.5, 356.6, 356.7; 360/96.3, 96.4

[56] References Cited

U.S. PATENT DOCUMENTS 3,942,745  3/1976  Ishikawa ........................... 242/356.5
5,230,483  7/1993  Kang .
5,251,845  10/1993  Ryu .................................. 242/356.3
5,501,408  3/1996  Kang et al. ...................... 242/356.5
5,573,197  11/1996  Choi ................................. 242/356.6
5,735,476  4/1998  Kim et al. ........................ 242/356.5
5,788,175  8/1998  Hwang ............................. 242/356.5

FOREIGN PATENT DOCUMENTS 2224876  5/1990  United Kingdom .

Primary Examiner—John P. Darling
Attorney, Agent, or Firm—Pennie & Edmonds LLP

[57] ABSTRACT

A reel driving device is provided with a driving pulley, an actuating member rotatable about a shaft, having a slant slot formed through, a driving torque converter for generating a proper torque depending on a mode of the VCR and for rotating the actuating member, a driving gear member having a gear portion meshed with an idler, and a connecting bar whose inner end is retained in the slant slot and mounted to be movable along the shaft and to be rotatable about the shaft.

6 Claims, 4 Drawing Sheets

REEL DRIVING DEVICE CAPABLE OF ELIMINATING FRICTION BETWEEN A PRESSING PLATE AND A ROTATING DRIVING GEAR

FIELD OF THE INVENTION

The present invention relates to a reel driving device for use in a video cassette recorder("VCR"); and, more particularly, to a reel driving device incorporating therein a driving gear capable of rotating without a pressing plate coming into a contact therewith.

DESCRIPTION OF THE PRIOR ART

In general, a video cassette recorder includes a reel driving device for selectively transmitting a power from a capstan motor to a take-up reel disc or a supply reel disc. This reel driving device has a clutch means capable of generating a proper rotational speed of the reel disc required for various operating modes of the VCR which generally consist of a lower rotational speed mode, e.g., a play and a review modes, and a higher rotational speed mode, e.g., a fast forward and a rewind modes.

There is disclosed in U.S. Pat. No. 5,573,197 issued to Yoo-Kil Choi a reel driving device employing a clutch wheel, a spring and a pressing plate. The pressing plate depresses the clutch wheel in order to keep a driving pulley and a driving gear in a direct connection with each other during the higher rotational speed mode. The spring serves to return the clutch wheel to its initial position.

In the reel driving device constructed in this manner, however, there must be a continuous contact between the clutch wheel and the pressing plate to maintain the higher rotational speed mode. The contact between the rotating clutch wheel and the pressing plate in a rest state, however, leads to a severe friction therebetween causing to wear and a reduction of the service life of the components.

SUMMARY OF THE INVENTION

It is, therefore, a primary object of the invention to provide a video cassette recorder incorporating therein a reel driving device designed to allow a driving gear to rotate without a pressing plate coming into a contact therewith.

The above and other objects of the invention are accomplished by providing a video cassette recorder incorporating therein a reel driving device capable of operating in a variety of operating modes, having an idler for selectively transmitting the driving force of a capstan motor therethrough, said device comprising: a driving pulley having a cylindrical hub rotatably mounted to a support shaft of the deck and a flange extending from a lower part of the hub in a generally perpendicular relationship with each other; an actuating member rotatably mounted around the cylindrical hub and having an inner cylinder positioned around an upper part of the cylindrical hub and an outer cylinder concentrically and radially spaced from the inner cylinder; a torque generating means for generating a torque required for a selected operating mode of the VCR from a torque of the driving pulley and for transmitting the required torque to the actuating member; a driving gear member having a gear portion meshed with said idler and mounted to be movable along an axis of said hub between a first position, wherein the driving gear member is upwardly biased, and a second position, wherein the driving gear member is downwardly biased and to be rotatable about the axis of said hub; a biasing means for biasing the driving gear member toward the first and the second positions depending on a vertical position of said driving gear member with respect to said actuating member and for rotating said driving gear member in response to a rotation of the actuating member; and a locating means for initially determining the vertical position of said driving gear member with respect to said actuating member before the selected operating mode of the VCR begins.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
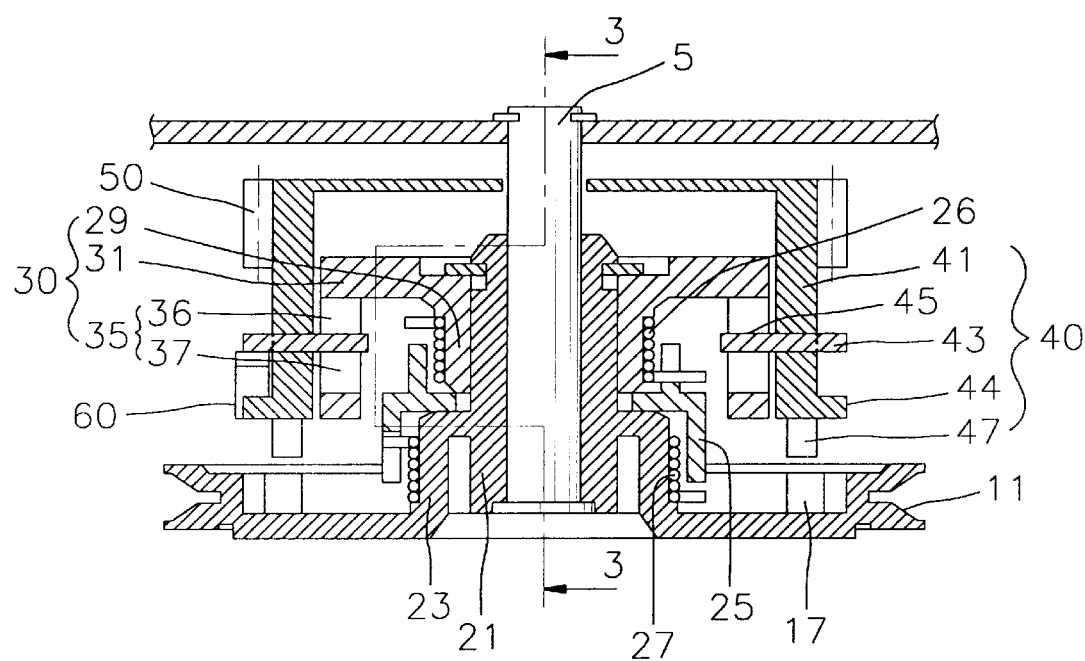
FIG. 1 illustrates a sectional view of a reel driving device in accordance with the present invention.
Figure 2:
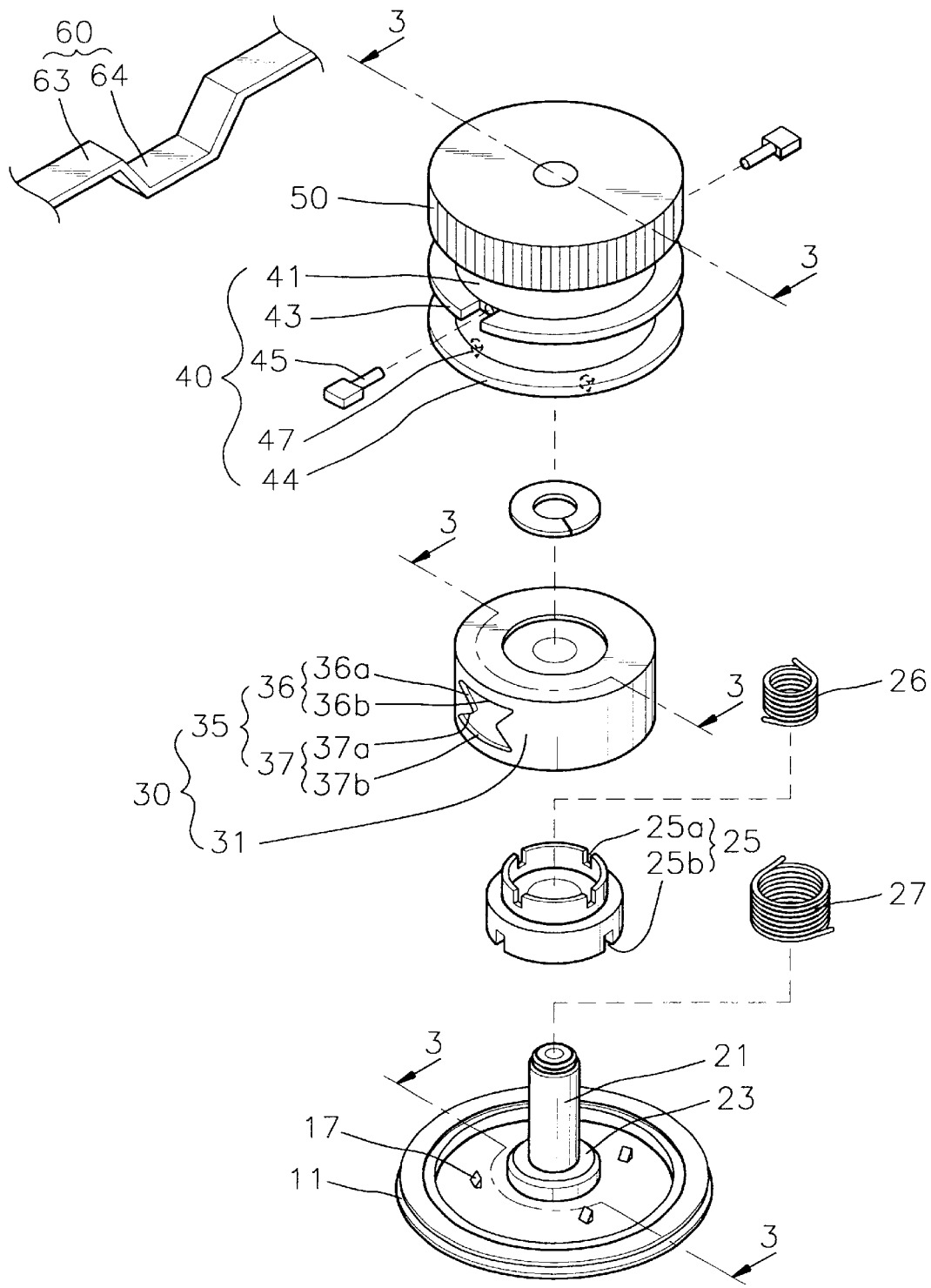
FIG. 2 shows an exploded perspective view of the inventive reel driving device.

Referring to FIGS. 1 and 2, a power transmitted to a driving pulley 11 is transmitted to a driving gear 50 through a torque converting means connected to the driving pulley 11, an actuating member 30 connected to the torque converting means, a driving gear member 40 rotating in response to the actuating member 30 in a reel driving device in accordance with the present invention.

The driving pulley 11 on which four connection ridges 17 are formed is rotatably mounted around a support shaft 5.

The torque converting means includes a cylindrical hub 21 extending from the driving pulley 11, a flange 23 extending from the cylindrical hub 21, a stepped spring holder 25 and a first and a second one-way clutch springs 26 and 27. The stepped spring holder 25 is of a cylindrical configuration having a plurality of upper and lower slits 25a and 25b on its an upper and a lower ends, respectively. The first one-way clutch spring 26 is inserted around an inner cylinder 29 of the actuating member 30, one end thereof being retained in one of the upper slits 25a. The second one-way clutch spring 27 is inserted around a lower part of the cylindrical hub 21 which has a greater diameter than that of the inner cylinder 29. One end of the second one-way clutch spring 27 is retained in one of the lower slits 25b. The second one-way clutch spring 27 has a greater diameter than that of said first one-way clutch spring 26 and an opposite helical configuration to that of the first one-way clutch spring 26.

A similar one to the torque converting means employed in the instant invention is disclosed in U.S. Pat. No. 5,573,197 incorporated herein by reference.

The actuating member 30 includes the inner cylinder 29, an outer cylinder 31 extending from the inner cylinder 29 and a pair of slant slots 35 formed through the outer cylinder 31. As shown in FIG. 2, each of the slant slots 35 is divided into a first and a second track areas 36 and 37. In accordance with a preferred embodiment of the present invention, each of the slant slots 35 is of a substantially opposed two triangle-shaped configuration which two triangles are partially overlapping with each other. Each of the track areas 36 and 37 has a pair of slant surfaces 36a and 37a, and limitation surfaces 36b and 37b.

The driving gear member 40 is provided with a lateral wall 41, a pair of first and second disc layers 43 and 44, four connection protrusions 47 and a pair of connection bars 45. The driving gear member 40 has the driving gear 50 meshed with an idler which selectively transmits the driving force of a capstan motor(not shown) therethrough to one of a supply and a take-up reel discs(not shown) rotatably mounted to a deck of the VCR. The driving gear member 40 is mounted to be movable along an axis of the cylindrical hub 21 between a first position, wherein the driving gear member 40 is upwardly biased, and a second position, wherein the driving gear member 40 is downwardly biased. Further, the driving gear member 40 is rotatable about the axis of the cylindrical hub 21. A pair of disc layers 43 and 44 is formed on a lateral external surface, being vertically spaced from each other. Each of the connection protrusions 47 vertically protrudes from the driving gear member 40 so that it can be engaged with the connection ridges 17 for a direct power transmission between the driving pulley 11 and the driving gear 50 when the driving gear member 40 is positioned in the second position. As shown in FIG. 2, the pair of connection bars 45 protrudes from the lateral wall 41 toward an inside space, being opposite to each other. In the preferred embodiment, each of the connection bars 45 is made as a separate component and is closely fitted through the lateral wall 41, being perpendicular to the same 41. As a result, one end of the connection bar 45 is positioned inside the driving gear member 40 and the other end fits with the disc layer 43.

The driving gear 50 is integrally formed along an external periphery of the driving gear member 40 and has a long width enough to maintain an uninterrupted engagement with the idler.

In order to determine an initial vertical position of the driving gear member 40, a pressing plate 60 is positioned near the driving gear member 40. The pressing plate 60 is of a stepped plate-shaped configuration and has a first and a second steps 63 and 64. The pressing plate 60 is movably mounted on the deck to allow the first and the second steps 63 and 64 to come into a contact with a corresponding disc layer 43 or 44.

The following describes an operation of the inventive reel driving device with reference to FIGS. 3 through 6.

Figure 3:
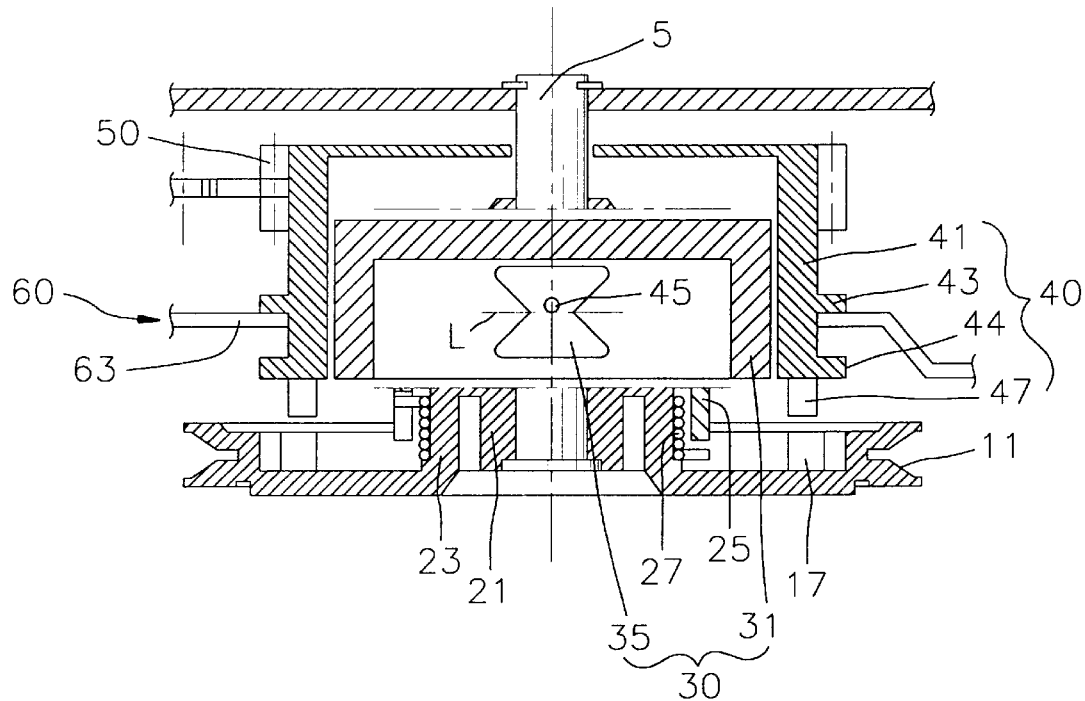
FIG. 3 offers a sectional view of the inventive reel driving device in a rest state of a VCR, taken along a line 3—3 in FIG. 1.

FIG. 3 shows the inventive reel driving device in a rest state of the VCR. As shown, the connection bar 45 becomes positioned in the first track area 36, i.e., an upside of a border line L, due to the first step 63 depressing against the first disc layer 43.

Figure 4:
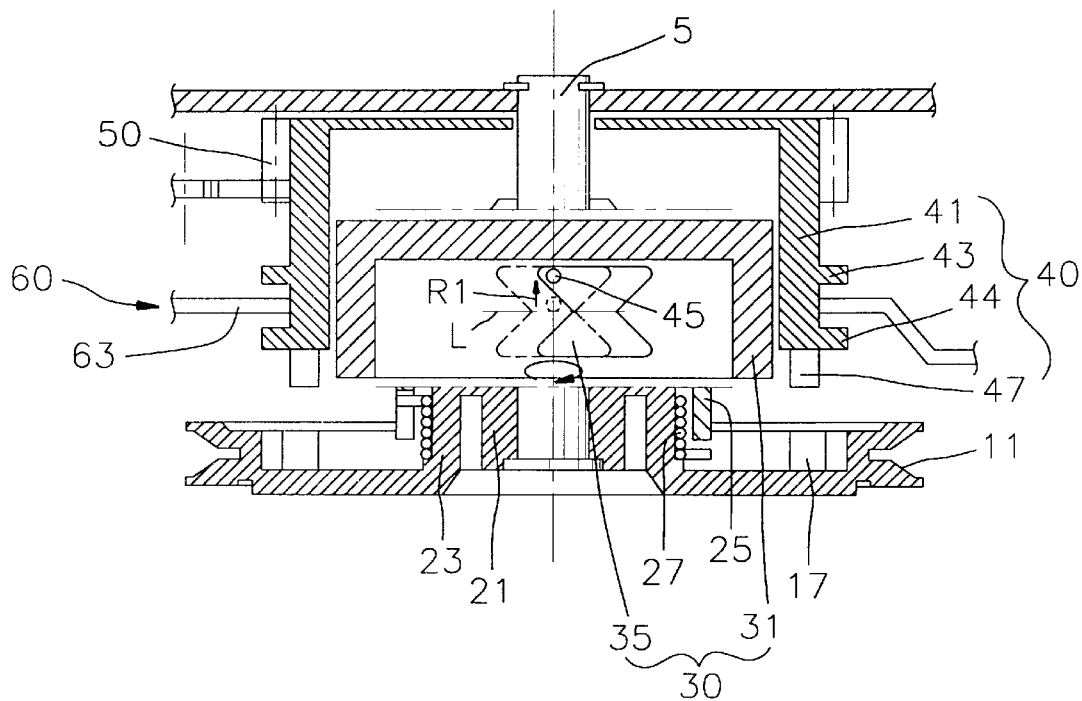
FIG. 4 describes a sectional view of the inventive reel driving device in a lower rotational speed mode of the VCR.

The inventive reel driving device in a lower rotational speed mode is illustrated in FIG. 4. As shown, the connection bar 45 moves up as indicated with an arrow R1, in response to a contact with the slant surface 36a of the first track area, when the actuating member 30 starts to rotate. The upward movement of the connection bar 45 moves up, in turn, the entire driving gear member 40, stopping on the limitation surface 36b, separating the first disc layer 43 from the pressing plate 60. That is, the driving gear 50 can rotate without coming into a contact with the pressing plate 60.

Figure 5:
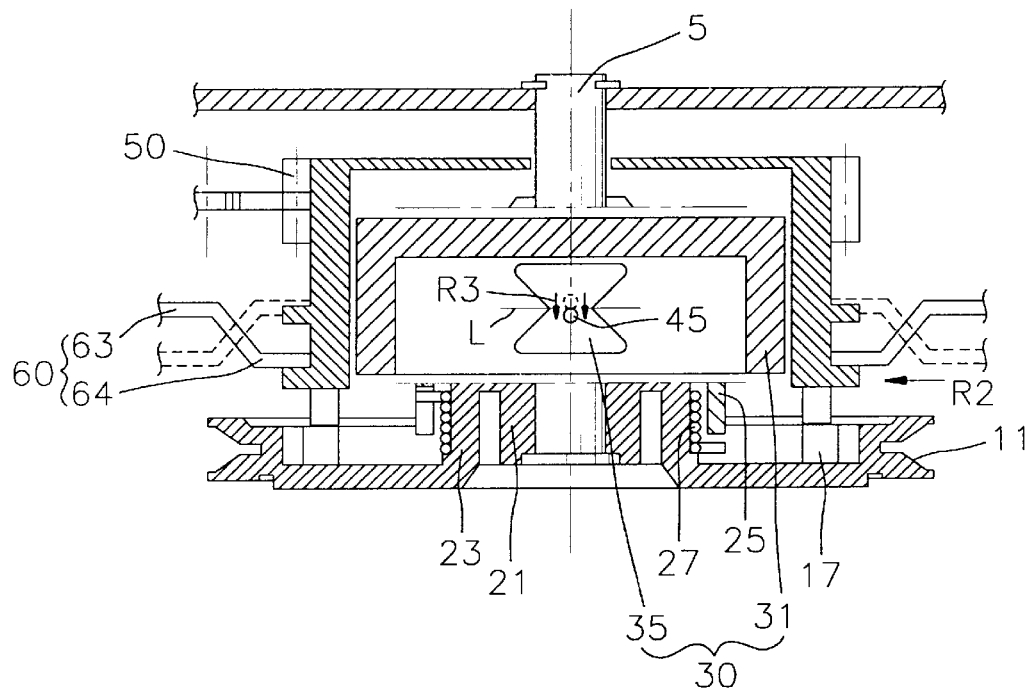
FIG. 5 represents a position change of a connection bar when the VCR mode is switched to a higher rotational speed mode from the lower mode.
Figure 6:
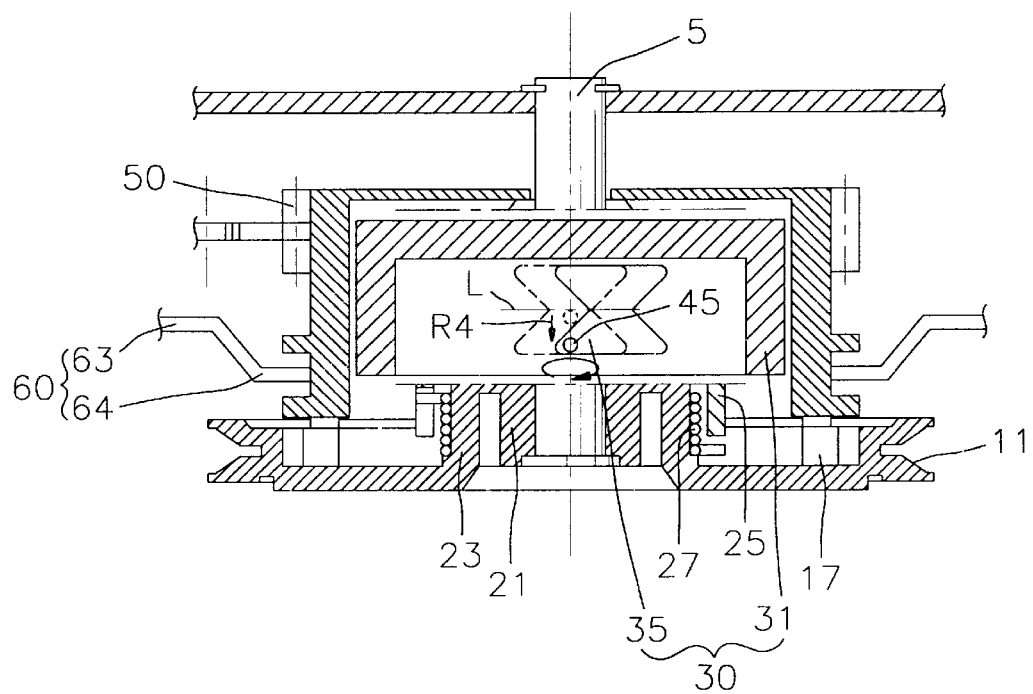
FIG. 6 presents a sectional view of the inventive reel driving device in a higher rotational speed mode of the VCR.

The inventive reel driving device in a higher rotational speed mode is illustrated in FIGS. 5 and 6. FIG. 5 illustrates a position of the connection bar 45 when a current mode is switched to the higher rotational speed mode from the lower mode. As shown, the connection bar 45 becomes positioned in the second track area 37, i.e., a downside of the borderline L, due to the second step 64 depressing against the second disc layer 44 in response to a movement of the pressing plate 60 as indicated with an arrow R2. As shown in FIG. 6, the connection bar 45 moves down as indicated with an arrow R4, in response to a contact with the slant surface 37a of the second track area, when the actuating member 30 starts to rotate. The downward movement of the connection bar 45 moves down, in turn, the entire driving gear member 40, stopping on the limitation surface 37b, making the second disc layer 44 be separated from the pressing plate 60. At this moment, the direct power transmission between the driving pulley 11 and the driving gear member 40 is obtained through the engagement between the connection ridges 17 and the connection protrusions 47. As a result, the driving gear 50 can rotate a higher rotational speed.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder provided with a reel driving device capable of operating in a variety of operating modes, having an idler for selectively transmitting the driving force of a capstan motor, said device comprising:

a driving pulley having a cylindrical hub rotatably mounted to a support shaft of a deck and a flange extending from a lower part of the hub in a generally perpendicular relationship with each other;

an actuating member rotatably mounted around the cylindrical hub and having an inner cylinder positioned around an upper part of the cylindrical hub and an outer cylinder concentrically and radially spaced from the inner cylinder;

a torque generating means for generating a torque required for a selected operating mode of the VCR from a torque of the driving pulley and for transmitting the required torque to the actuating member;

a driving gear member having a gear portion meshed with said idler and mounted to be movable along an axis of said hub between a first position, wherein the driving gear member is upwardly biased, and a second position, wherein the driving gear member is downwardly biased and to be rotatable about the axis of said hub;

a biasing means for biasing the driving gear member toward the first and the second positions depending on a vertical position of said driving gear member with respect to said actuating member and for rotating said driving gear member in response to a rotation of the actuating member; and a locating means for initially determining the vertical position of said driving gear member with respect to said actuating member before the selected operating mode of the VCR begins.

2. The video cassette recorder of claim 1, further comprising a direct connection means for non-rotatably engaging said driving pulley when the driving gear member is positioned in the second position.

3. The video cassette recorder of claim 2, wherein said biasing means comprises:

a pair of connection bars protruding from a lateral wall of the driving gear member toward an inside space, being opposite to each other; and a pair of slant slots formed through said actuating member to keep said bars therein, respectively, each of the slant slots having an upward and a downward slant surfaces so positioned that one of the slant surfaces comes into a contact with a corresponding bar in response to the actuating member rotating.

4. The video cassette recorder of claim 3, wherein each of the slant slots is of a substantially opposed two triangle-shaped configuration which two triangles are partially overlapping with each other.

5. The video cassette recorder of claim 2, wherein said locating means comprises:

a pair of disc layers formed on a lateral external surface of the driving gear member, being vertically spaced from each other; and a stepped pressing member for vertically pressing one of the disc layers to locate the driving gear member an initial position required for the selected operating mode before the selected operating mode of the VCR begins.

6. The video cassette recorder of claim 1, wherein the torque generating means comprises:

a cylindrical stepped spring holder having a plurality of slits formed at upper and lower portion thereof;

a first one-way clutch spring positioned around the inner cylinder of said actuating member, one end of said first clutch spring being fixed to one of the upper slits; and a second one-way clutch spring with an opposite helical configuration to that of said first one-way clutch spring, inserted around the lower part of the hub which has a greater diameter than that of the inner cylinder, one end of said second one-way clutch spring being fixed to one of the lower slits, said second spring having a greater diameter than that of said first spring.

* * * * *